(12) United States Patent
Ochiai

(10) Patent No.: US 6,829,467 B2
(45) Date of Patent: Dec. 7, 2004

(54) APPARATUS FOR SETTLING ACCOUNTS AND METHOD OF SETTLING ACCOUNTS

(75) Inventor: Takayuki Ochiai, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 264 days.

(21) Appl. No.: 10/247,394

(22) Filed: Sep. 19, 2002

(65) Prior Publication Data

US 2003/0061066 A1 Mar. 27, 2003

(30) Foreign Application Priority Data

Sep. 25, 2001 (JP) ......................................... 2001-292290

(51) Int. Cl.$^7$ ............................. H04B 7/00; G06F 17/60
(52) U.S. Cl. ................ 455/41.2; 455/552.1; 455/556.1; 705/16; 705/41; 235/380
(58) Field of Search ............................... 455/41.1, 41.2, 455/41.3, 406, 407, 408, 410, 411, 426.1, 550.1, 552.1, 553.1, 556.1, 556.2, 517, 561; 705/1, 16, 34, 39, 40, 41, 44; 235/379, 380

(56) References Cited

U.S. PATENT DOCUMENTS

| | | | |
|---|---|---|---|
| 6,016,956 A | | 1/2000 | Takami et al. |
| 6,394,341 B1 | * | 5/2002 | Makipaa et al. ............ 235/379 |
| 6,434,403 B1 | * | 8/2002 | Ausems et al. .......... 455/556.2 |
| 6,676,017 B1 | * | 1/2004 | Smith, III ................... 235/380 |
| 2002/0003481 A1 | | 1/2002 | Kantola et al. |

FOREIGN PATENT DOCUMENTS

| | | | | |
|---|---|---|---|---|
| GB | 0848369 A1 | * | 6/1998 | ............. G07F/7/10 |
| GB | 2376782 A | * | 12/2002 | ............. G07C/9/00 |
| JP | 2001-156704 A | | 6/2001 | |
| WO | WO 01/86880 A2 | | 11/2001 | |

* cited by examiner

Primary Examiner—Quochien B. Vuong
(74) Attorney, Agent, or Firm—Frishauf, Holtz, Goodman & Chick, P.C.

(57) ABSTRACT

An account-settling apparatus changes the range of communication between it and a portable device having a radio communication address, from a first range to a second range and vice versa. The first range lies near the antenna of the apparatus. The second range is broader than first range. The apparatus acquires the radio communication address from the portable device existing in the first range, while the range of communication maintained at the first range, then expands the range of communication to the second range, receives the data necessary for settling accounts for a transaction, from the portable device that has the radio communication address acquired, and settles account for the transaction.

9 Claims, 5 Drawing Sheets

APPARATUS FOR SETTLING ACCOUNTS AND METHOD OF SETTLING ACCOUNTS

CROSS-REFERENCE TO RELATED APPLICATIONS

This application is based upon and claims the benefit of priority from the prior Japanese Patent Application No. 2001-292290, filed Sep. 25, 2001, the entire contents of which are incorporated herein by reference.

BACKGROUND OF THE INVENTION

1. Field of the Invention

The present invention relates to an apparatus and method for settling accounts in commercial transaction between a shop and any customer visiting the shop. The apparatus and method are designed to settle accounts, whereby the customer need not pay in cash for the goods he or she buys at the shop. More specifically, the data necessary to settle accounts is inputted from the customer's portable device into the apparatus, and the apparatus settles account in accordance with the data input. The portable device can function as a short-range radio communication terminal.

2. Description of the Related Art

In recent years, portable devices that can perform short-range radio communication are put on the market, one after another. The aerial power for short-range radio communication is limited to a prescribed value or less. Any person needs no license to use radio wave for short-range radio communication. For example, Bluetooth, which is an interface standard for radio communication over a short-range of about 10 m, is applied to portable devices such as mobile telephones.

A mobile telephone that can perform short-range radio communication may hold electronic money. If so, it can be used to settle accounts in any shop that has a point-of-sales (POS) terminal. In this case, the POS terminal receives some of the electronic money from the mobile telephone by virtue of the short-range radio communication. Thus, the accounts are settled in the shop.

The POS terminal functions as a base station in the short-range radio communication. The POS terminal determines whether any mobile telephone that can communicate with it exists in the vicinity. When a customer carrying a mobile telephone enters the shop, the mobile telephone is connected by the short-range radio to the POS terminal. In the shop, the mobile telephone functions as a mobile station in the short-range radio communication. Thus, when customers carrying a mobile telephone each step into the shop, the POS terminal detects the mobile telephones, one after another.

Now that the POS terminal has detected several mobile telephones, the operator of the POS terminal needs to identify one of them as the mobile telephone of the customer with whom the operator has to settle accounts. Two methods are available to identify the mobile telephone.

In the first method, the operator asks the customer about the number of the mobile telephone the customer is carrying for account. On the other hand, the phone numbers of the detected mobile telephones in the shop have been transmitted to the POS terminal by the short-range radio. Accordingly, the operator can identify the payer's mobile telephone with the phone number told by the customer.

In the second method, the area in which the POS terminal can communicate with mobile telephones by the short-range radio is reduced so that the POS terminal detects only one mobile telephone at a time. The area of the communication is limited to the smaller area around the POS terminal. The smaller area is substantially on the surface of the POS terminal. The customer holds the mobile telephone out into the area and puts the data (e.g., ID number) in it. The inputted data is transmitted to the POS terminal by shot-range radio and use for settling accounts.

The first method is not practical, however. The telephone number that the customer tells the operator may be known to some others who are undesirable for the customer. Therefore, most customers hesitate to tell their phone numbers to the operator around the POS terminal. Besides, the necessity of asking the customer about the telephone number complicates the procedure for settling accounts.

The second method is not practical, too. Several customers carrying the mobile telephone get together at the POS terminal for settling accounts. The area in which the POS terminal detects only one of the mobile telephones must be determined from the distance between any two adjacent customers around the POS terminal. The distance tends to change at frequently intervals. The fewer the customers at the POS terminal, the longer the distance is. It is difficult to set an appropriate area on the occasion of settling accounts with the customer. If the area set is very small, any customer who wants to settle accounts needs to take an unnatural position to bring his or her mobile telephone into the area while settling.

An object of the present invention is to provide an apparatus and method for settling accounts which can identify, among portable devices capable of performing short-range radio communication, some portable devices held by persons who wish to settle accounts, which can receive data transmitted from the portable devices identified, and which can settle account in accordance with the data received by virtue of the short-range radio communication.

According to an aspect of the invention, there is provided an apparatus for settling accounts, which comprises: short-range communications means for storing data necessary for settling accounts for a transaction and designed to perform short-range radio communication with at least one portable device which is assigned with a radio communication address for the short-range radio communication; an antenna which radiates and catch radio waves to help the short-range communications means to perform the short-range radio communication; range-controlling means for setting the range of the short-range radio communication to a first communication range lying near the antenna or a second communication range broader than the first communication range; address-acquiring means for acquiring the radio communication address from said at least one portable device approaching the antenna, after the range-controlling means has set the range of the short-range radio communication to the first communication range; range-expanding means for causing the range-controlling means to expand the range of the short-range radio communication to the second communication range when the address-acquiring means acquires the radio communication address from said at least one portable device; data-receiving means for receiving the data necessary for settling accounts, from said at least one portable device by virtue of the short-range radio communication after the range-expanding means has caused the range-controlling means to expand the range of the short-range radio communication; and account-settling means for settling accounts for the transaction on the basis of the data that the data-receiving means has received.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described, with reference to the accompanying drawings.

The embodiment is a POS terminal that is to be installed in a shop and used as an apparatus for settling accounts. The POS terminal can function as a base station in short-range radio communication. The POS terminal receives data necessary for settling accounts, from portable device that function as a mobile station in the short-range radio communication, and settles account in accordance with the data received from the portable device. The portable device is, for example, mobile telephone carried by the customer visiting the shop where the POS terminal is installed.

Needless to say, each mobile telephone works as a mobile communications device. But also can it perform short-range radio communication to transmit and receive data to and from the POS terminal. Moreover, the mobile telephone holds electronic money (i.e., digital data representing an amount of money) that can be used in settling accounts with the shop.

Figure 1:
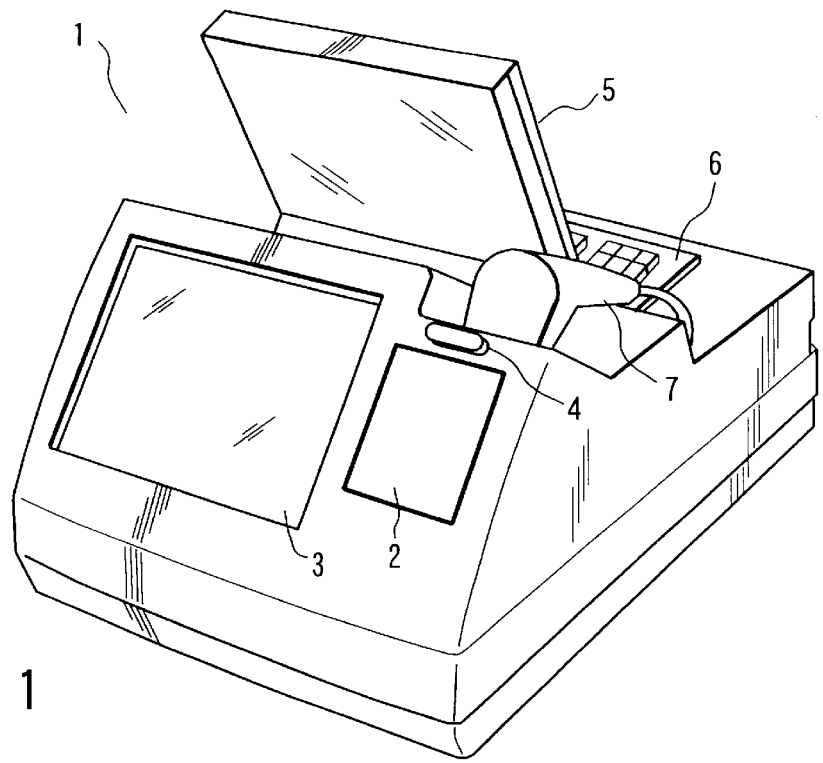
FIG. 1 is a perspective view of a POS terminal according to an embodiment of this invention, as viewed from a customer standing near the POS terminal.

FIG. 1 is a perspective view of the POS terminal 1, as viewed from a customer who is standing near the POS terminal. As FIG. 1 shows, the POS terminal 1 has a guidance display 2, a customer-side display 3, an antenna 4, an operator-side display 5, and a keyboard 6. A scanner 7 is connected to the POS terminal 1.

The guidance display 2, customer-side display 3 and antenna 4 are provided on the customer side, close to one another. The guidance display 2 displays guidance to the customer, e.g., a method of settling accounts. The guidance display 2 has a blue frame. The customer-side display 3 displays to the customer the information about the transaction made between the customer and the shop. The information includes the name and price of any item sold to the customer.

The antenna 4 radiates radio waves, thus transmitting data from the POS terminal 1. The radio waves have a specific frequency prescribed for short-range radio communication such as Bluetooth. The antenna 4 receives radio waves of frequencies for short-range radio communication. The antenna 4 has such directivity that the radio waves propagate toward a space existing in front of the guidance display 2.

The operator-side display 5 and the keyboard 6 are provided on the operator side. The operator-side display 5 displays specific data to the POS terminal operator. The keyboard 6 has keys that the operator may operate to input data, instructions and the like into the POS terminal 1.

The scanner 7 can read data from the barcodes put on the items sold in the shop and input the data into the POS terminal 1.

Figure 2:
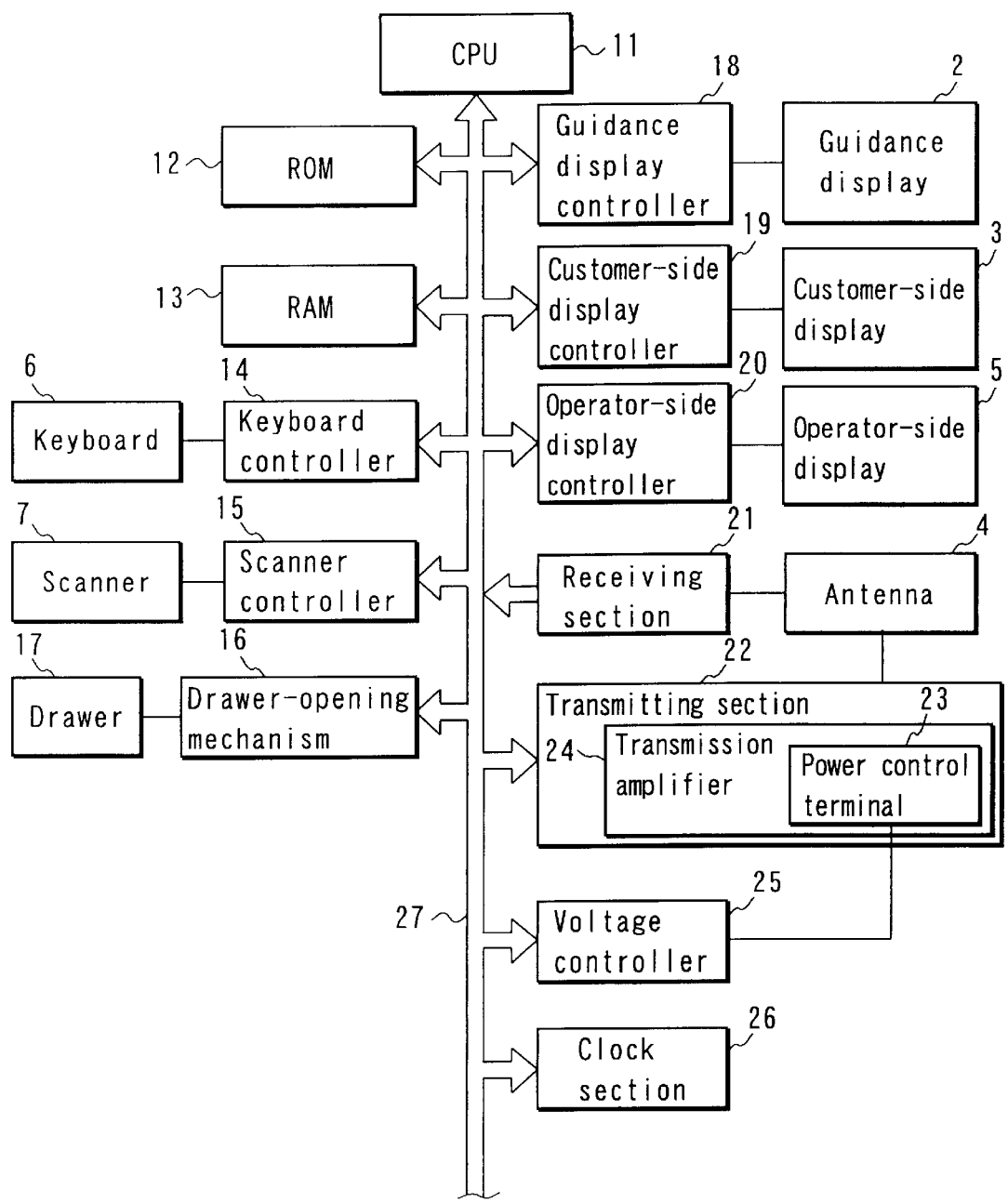
FIG. 2 is a block diagram of the POS terminal.

FIG. 2 is a block diagram of the POS terminal 1. As FIG. 2 shows, the POS terminal 1 comprises a CPU (Central Processing Unit) 11, a ROM (Read-Only Memory) 12, a RAM (Random-Access Memory) 13, a keyboard controller 14, a scanner controller 15, a drawer-opening mechanism 16, a drawer 17, a guidance display controller 18, a customer-side display controller 19, an operator-side display controller 20, a receiving section 21, a transmitting section 22, a voltage controller 25, and a clock section 26, in addition to the guidance display 2, customer-side display 3, antenna 4, operator-side display 5, keyboard 6 and scanner 7.

A bus line 27 connects the CPU 11, ROM 12, RAM 13, keyboard controller 14, scanner controller 15, drawer-opening mechanism 16, guidance display controller 18, customer-side display controller 19, operator-side display controller 20, receiving section 21, transmitting section 22, voltage controller 25 and clock section 26.

The CPU 11 controls most of the other components of the POS terminal 1. Another function of the CPU 11 is due to programs read from the ROM 12 and processes data in accordance with the programs. The ROM 12 stores the programs to be executed by the CPU 11. The ROM 12 further stores data items representing various messages, a program for mobile telephones, device IDs and the like. The program for mobile telephone can be transmitted from the POS terminal 1 to any mobile telephone by virtue of short-range radio communication. The program transmitted to the mobile telephone is executed by its CPU to process data for settling accounts. The device IDs are assigned to mobile telephones, i.e., short-range communications devices, respectively. Hence, each mobile telephone is uniquely identified with the device ID assigned to it and is therefore distinguished from any other mobile telephones. The device IDs are used to calculate a pattern of frequency hopping employed to prevent radio interference and interception in the short-range radio communication. (Frequency hopping is a communication mode in which the frequency of the radio waves is changed at short intervals.)

The RAM 13 stores various items of data in accordance with the various programs executed by the CPU 11.

The keyboard controller 14 acquires the data that the operator has input by operating the keyboard 6, and supplies the data to the CPU 11 and the RAM 11 through the bus line 27. The scanner controller 15 acquires the barcode data that the scanner 7 has read, and sends the data to the CPU 11 and the RAM 13 via the bus line 27. The drawer-opening mechanism 16 opens the drawer 17 that holds cash and the like. The guidance-display controller 18 controls the guidance display 2 in accordance with the instructions received from the CPU 11. Thus controlled, the guidance display 2 displays various items of information. The customer-side display controller 19 controls the customer-side display 3 in accordance with the instructions received from the CPU 11. The customer-side display 3, so controlled, displays various items of information. The operator-side display controller 20 controls the operator-side display 5 in accordance with the instructions received from the CPU 11. Thus controlled, the operator-side display 5 displays various items of information.

The receiving section 21 receives the data transmitted from any short-range communications device (e.g., a mobile telephone) in the form of the radio waves caught by the antenna 4. The receiving section 21 forwards the data to the CPU 11 and RAM 13 through the bus line 27. The CPU 11 sets the receiving section 21 at a low data-receiving sensitivity, an intermediate data-receiving sensitivity, or a high data-receiving sensitivity. Once set at the low data-receiving sensitivity, the section 21 can detect only radio waves of the short-range communications frequency, emanating from any short-range communications device that is very close to the guidance display 2. Once set at the intermediate data-receiving sensitivity, the section 21 can detect radio waves of said frequency, sent from any short-range communications device within a radius of ten centimeters from the POS terminal 1. Once set at the high data-receiving sensitivity, the section 21 can detect radio waves of said frequency, sent from any short-range communications device within a radius of a few meters from the POS terminal 1. The data-receiving sensitivity of the section 21 can be progressively changed between the low sensitivity and the intermediate sensitivity. More specifically, the electric-field intensity of the wave caught by the antenna 4 is measured, the electric-field intensity measured is compared with a threshold selected by the CPU 11 from the preset ones. The data-receiving sensitivity corresponding to the electric-field intensity is selected if the intensity is lower than the threshold.

The transmitting section 22 generates short-range radio communication waves representing the data to be transmitted from the antenna 4 to any short-range communications device. The transmitting section 22 comprises a power control terminal 23 and a transmission amplifier 24. A voltage is applied from the power control terminal 23 to the transmission amplifier 24. The voltage controller 25 controls the voltage to be applied to the power control terminal 23 of the transmission section 22. The voltage applied from the voltage controller 25 to the power control terminal 23 changes the communication range over which radio waves can travel by the short-range radio communication. The communication range can be changed from the first communication range to the second communication range, and vice versa. The first communication range falls within the blue frame of the guidance display 2 (i.e., within several centimeters from the antenna 4). The second communication range is broader than the first communication range. (The second communication range is within a radius of a little less than 10 meters from the antenna 4). When the communication range is the first communication range, the POS terminal can communicate with only one mobile telephone that exists within the first range. When the communication range is the second communication range, the POS terminal 1 can communicate with all mobile telephones existing in the second communication range. Further, the voltage controller 25 can control the voltage applied to the power control terminal 23 to gradually change the first communication range.

In the POS terminal, the receiving section 21 and the transmitting section 22 cooperate to change the first communication range gradually so that only one mobile telephone may be identified as one whose payer carries for settling accounts. The POS terminal 1 can increase the communication range to the second communication range in which any payer can easily operate his or her mobile telephone, in a natural position, in order to settle counts with the shop.

The clock section 26 generates time data. The clock section 26 clocks prescribed time by fixed timing.

The ROM 12 stores the data representing the messages to be displayed on the guidance display 2, customer-side display 3 and operator-side display 5. The ROM 12 further stores the data representing the messages to be displayed on the display of the mobile telephone held by any customer visiting the shop. The guidance display 2 displays the messages explaining how the customer can settle account with the shop by using his or her mobile telephone. These messages are, for example, "Hold your telephone within the blue frame," "Check the amount and input the code for authenticating the settlement," and "Account has been settled." The customer-side display 3 displays a commercial message while it remains in standby state. When the POS-terminal operator registers any item the customer has just bought, the customer-side display 3 displays the information about the item. If the operator makes an error in registering the item, the operator-side display 5 displays an error message. The display of the mobile telephone carried by payer who wishes to settle accounts with the phone displays a message asking the customer to input a confirmation code and a code for authenticating the settlement.

The RAM 13 has a work area, a first area (first storage area), and a second area (second storage area). The work area is used to for various calculations. The first area is provided to store the device IDs acquired by the short-range radio communication from mobile telephones identified as candidates for settling accounts. The second area is provided to store the device IDs acquired from mobile telephones determined as unsuccessful candidate for settling accounts.

Among the keys on the keyboard 6 are a sub-total key, an electronic settlement key, a receipt/cash-settlement key. The operator may push the sub-total key to cause the POS terminal 1 to calculate the amount the customer should pay in one transaction the basis of the registered item. The operator may depress the electronic settlement key for having the electronic money transferred to the POS terminal 1 from the customer's mobile telephone by the short-range radio communication. The operator may push the receipt/cash-settlement key after receiving cash from the customer, to make the POS terminal 1 perform a cash settlement for the transaction.

Figure 3:
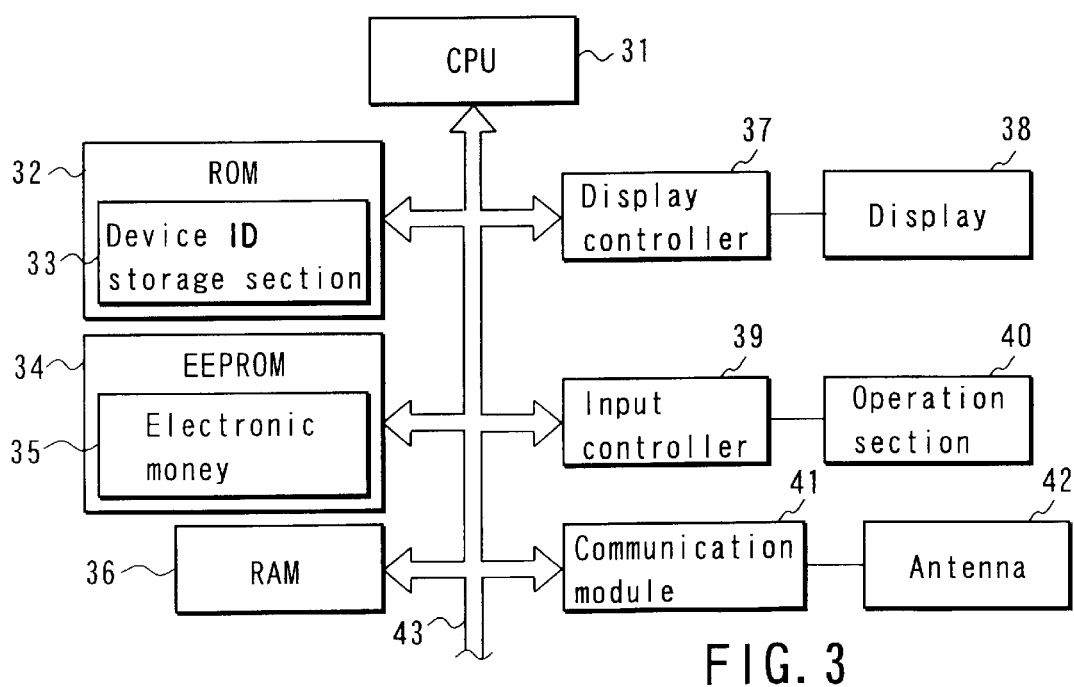
FIG. 3 is a block diagram of a mobile telephone.

FIG. 3 is a block diagram of a mobile telephone. As FIG. 3 shows, the mobile telephone comprises a CPU 31, a ROM 32, an EEPROM (Electronic Erasable, Programmable Read Only Memory) 34, a RAM 36, a display controller 37, a display 38, an input controller 39, an operation section 40, a communications module 41, and an antenna 42.

A bus line 43 connects the CPU 31, ROM 32, EEPROM 34, RAM 36, display controller 37, input controller 39 and communications module 41.

The CPU 31 controls the other components of the mobile telephone, reads programs from the ROM 32, and executes the programs to process data. The ROM 32 has a program storage section, a device ID storage section 33, and the like. The program storage section 33 stores various programs. The device ID storage section stores the device ID that is a radio communications address uniquely assigned to the mobile telephone. The EEPROM 34 stores an amount of electronic money. This data is used in settling accounts with the shop and can be rewritten in the EEPROM 34. The RAM 36 has storage areas including a work area.

The display controller 37 controls the display 38. The input controller 39 controls the data input from the operation section 40 that has a plurality of input keys. The communications module 41 can perform mobile telecommunications and the short-range radio communication with the base station, i.e., the POS terminal 1, by using the antenna 42.

Figure 4:
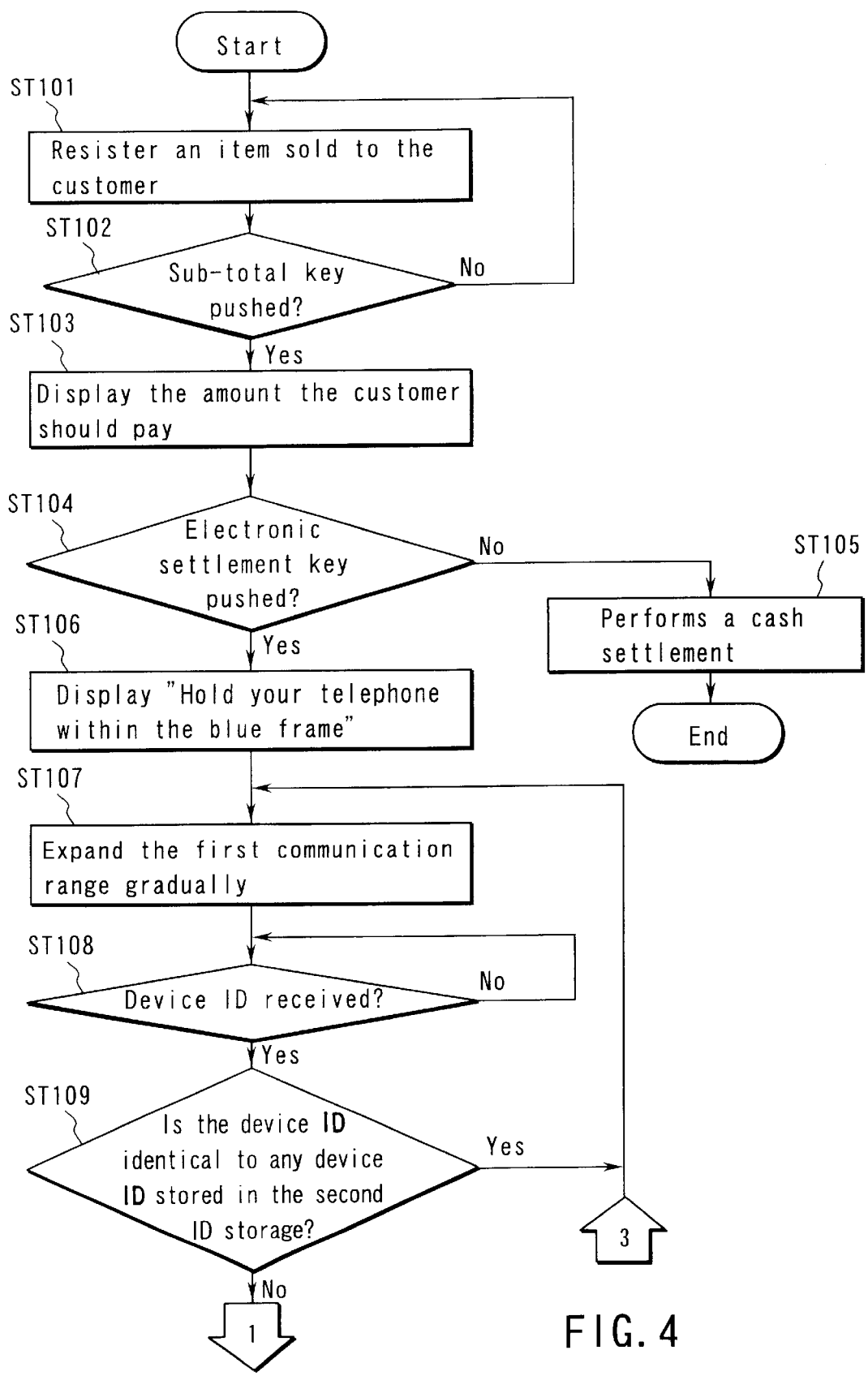
FIG. 4 is a flowchart explaining a part of the control procedure performed by the CPU incorporated in the PC terminal performs.
Figure 5:
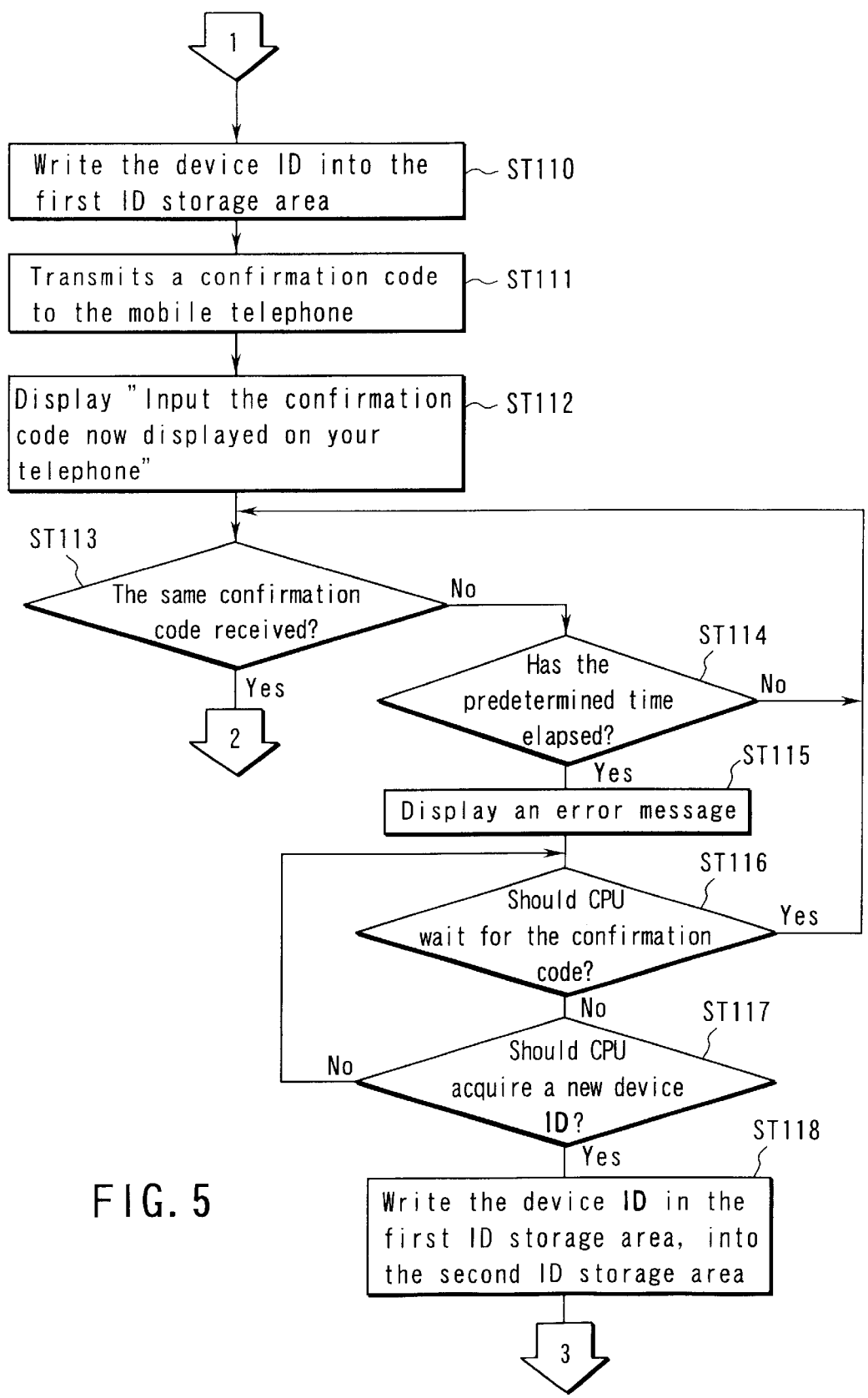
FIG. 5 is a flowchart representing another part of the control procedure performed by the CPU.
Figure 6:
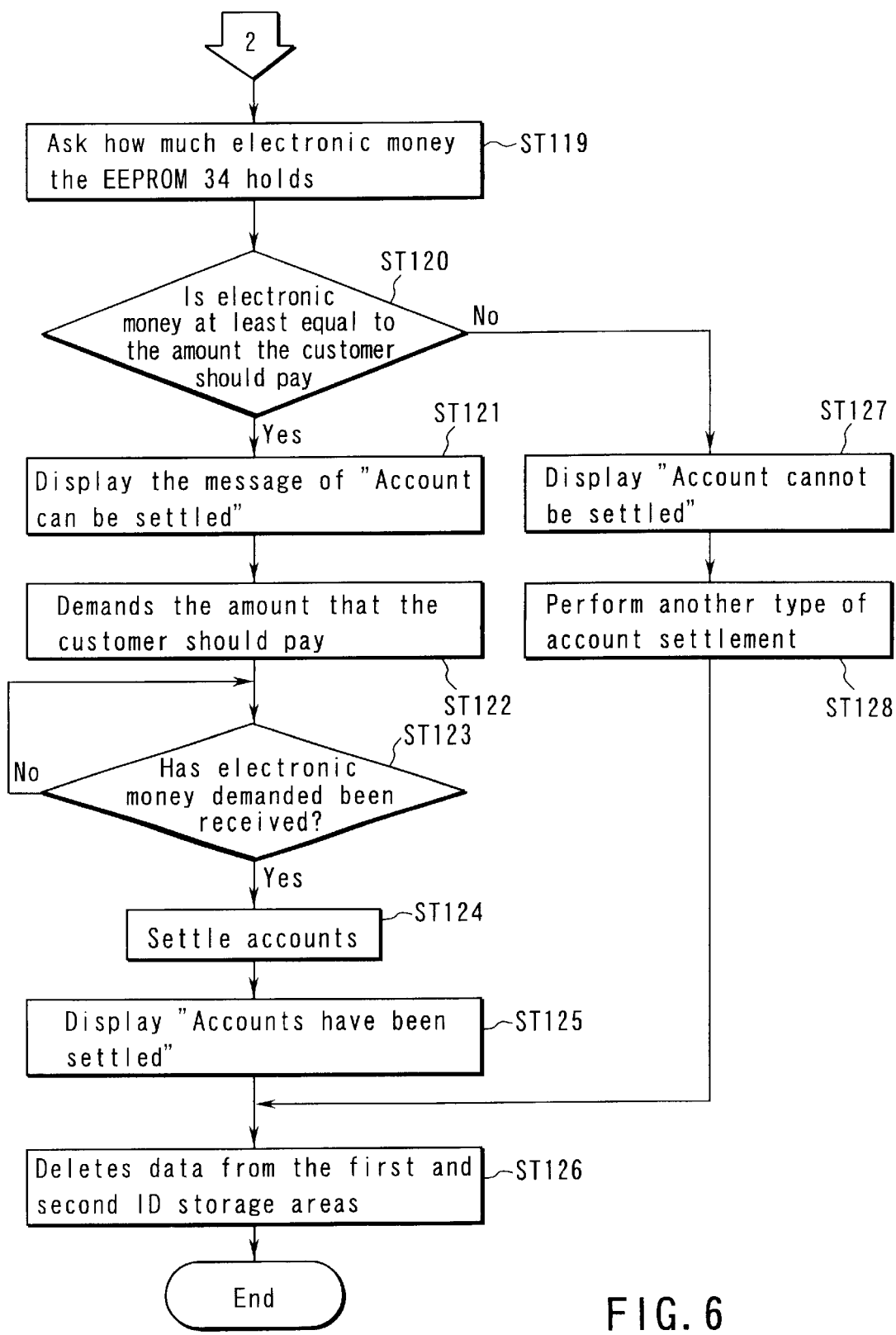
FIG. 6 is a flowchart illustrating the remaining part of the control procedure performed by the CPU.

FIGS. 4 to 6 are a flowchart that explains the sequence of steps that the CPU 11 incorporated in the POS terminal 1 performs to register any item sold and settle account for the item registered.

At Step ST101, the CPU 11 accepts the registration of an item sold to the customer. More precisely, the CPU 11 receives the barcode data from the scanner controller 15 and causes the customer-side display 3 and operator-side display 5 to display the name, price and the like of the item, which are represented by the barcode data. At the same time, the CPU 11 registers the sales amount based on the barcode data into a specific storage area of the RAM 13.

At Step ST102, the CPU 11 determines whether the operator has pushed the sub-total key. If YES, the process goes to Step ST103. At Step ST103, the CPU 11 calculates the amount that the customer should pay in one transaction, from the price of the item the sales amount of which has been registered. The CPU 11 then causes the customer-side display 3 and the operator-side display 5 to display the amount thus calculated.

At Step ST104, the CPU 11 determines whether the operator has depressed the electronic settlement key. If NO, the process goes to Step ST105. At Step ST105, the CPU 11 performs a cash settlement if the operator has pushed the receipt/cash-settlement key. That is, the CPU 11 opens the drawer 17 when the operator operates the keyboard 6, inputting the amount of the cash received from the customer.

The CPU 11 determines may determine, at Step ST104, that the operator has depressed the electronic settlement key. In this case, the process goes to Step ST106. At Step ST106, the CPU 11 causes the guidance display 2 to display the message of "Hold your telephone within the blue frame." At Step ST107, the CPU 11 repeatedly issues a command via the bus line 27, transmitting section 22 and antenna 4, requesting that the customer's mobile telephone should send its device ID to the POS terminal 1. While repeatedly issuing the command, the CPU 11 causes the voltage controller 25 to expand the first communication range gradually toward the maximum size thereof. (The center of the first communication range lies near the antenna 4.) Note that the CPU 11 does not designate any destination of the command. The CPU 11 keeps issuing this command until it receives a device ID by a short-range radio communication via the antenna 4, transmitting section 22 and bus line 27.

At Step ST108, the CPU 11 determines whether a device ID has reached the POS terminal 1 by the short-range radio communication. If YES, the CPU 11 acquires the device ID, which identifies the mobile telephone that can communicates with the POS terminal 1.

At Step ST109, the CPU 11 determines whether the device ID acquired at Step ST108 and identifying the mobile telephone existing in the first communication range is identical to any device ID stored in the second ID storage area of the RAM 13. If NO, the CPU 11 repeatedly performs Steps ST107 and ST108 to expand the first communication range and acquire a device ID of any mobile telephone existing in the first communication range.

If the device ID acquired at Step ST109 is not identical to any device ID stored in the second ID storage area, or if no device IDs are stored in the second ID storage area, the process goes to Step ST101. At Step ST110, the CPU 11 writes the device ID it has acquired by the short-range radio communication, into the first ID storage area of the RAM 13, as the device ID assigned to a mobile telephone whose holder wishes to settle accounts with the shop. Then, at Step ST111, the CPU 11 generates a confirmation code that the customer holding the mobile telephone should input by operating the operation section 40 of the mobile telephone. Further, the CPU 11 expands the communication range from the first range to the second range that is broader than the first range. The confirmation code is transmitted to only the mobile telephone having the device ID now stored in the first device ID storage area of the RAM 13, together with the amount the holder of the mobile telephone should pay to the shop.

The confirmation code is a random number transmitted from the POS terminal 1 immediately after it is generated. Besides, the confirmation code is not associated at all with the device ID of the POS terminal, stored in the ROM 12, or any device ID stored in the first ID storage area of the RAM 13. Hence, even if two or more settlements are carried out between the POS terminal and the same mobile telephone on the same day, the confirmation codes used to perform the settlements are scarcely identical. This enhances security.

At the same time the CPU 11 issues the confirmation code, it transmits a program for use in the mobile telephones. The CPU 31 of the mobile telephone receives and executes the program, causing the display 38 to display a prescribed message about the electronic settlement to be achieved, said message having been sent from the POS terminal 1 under the control of the CPU 11. The CPU 31 receives the data input from the operation section 40 of the mobile telephone and transmits the same to the POS terminal 1 by the short-range radio communication. Additionally, the CPU 31 controls the communication module 41, which receives and transmits any data about the electronic settlement from and to the POS terminal 1 (base station).

After the confirmation code and the other data are transmitted from the POS terminal 1, the CPU 11 acquires from the clock section 26 the time data representing the present time. The CPU 11 stores the time data into a specific area of the RAM 13 as the data that represents the time of transmitting the confirmation code to the mobile telephone. At Step ST112, the CPU 11 causes the guidance display 2 to display the message of "Input the confirmation code now displayed on the display of your telephone," requesting that the customer should operate the operation section 40 to input the confirmation code.

The CPU 11 waits for the confirmation code sent back from the mobile telephone, while maintaining the communication range at the second range that is broader than the first range.

At Step ST113, the CPU 11 determine whether it has received from the mobile telephone the same confirmation code sent from the POS terminal 1 to the mobile telephone. If NO, the process goes to Step ST114. At Step ST114, the CPU 11 determines whether a predetermined time has elapsed from the time of transmitting the confirmation code, which is represented by the data stored in the specific area of the RAM 13.

If YES at Step S114, the process goes to Step ST115. At Step ST115, the CPU 11 causes the operator-side display 5 to display an error message. The error message asks the operator whether he or she would like to wait for the confirmation code from the mobile telephone or to acquire the device ID of another mobile telephone. The CPU 11 causes the display 5 to display another message, together with the error message. This message reads, "Ask the customer if he or she has operated the telephone to input the confirmation code identical to the one displayed on the telephone."

At Step ST116, it is determines whether the CPU 11 should wait for the confirmation code from the mobile telephone. If YES, the process returns to Step ST113. At Step ST113, the CPU 11 again waits for the confirmation code that the mobile telephone should send back to the POS terminal 1, until the predetermined time elapses from the time when the confirmation code was transmitted to the mobile telephone.

If NO at Step ST116, the process goes to Step ST117. At Step ST117, it is determined whether the CPU 11 has received an instruction that it should acquire a new device ID, from the keyboard 6. If YES at Step S117, the process goes to Step ST118. At Step ST118, the CPU 11 reads the device ID from the first ID storage area of the RAM 13 and writes this device ID into the second ID storage area, as identifying a mobile telephone whose holder need not settle account with the shop. Then, the process returns to Step ST107. At Step ST107, the CPU 11 acquires the device ID of a mobile telephone which exists in the first range of short-range radio communication and which can therefore communicate with the POS terminal 1.

The CPU 11 may receive the confirmation code at Step ST113. If this is the case, the CPU 11 can determine that the device ID stored in the first ID storage area is the device ID assigned to the mobile telephone from which the POS terminal 1 should acquire settlement data. The process then goes to Step ST119. At Step ST119, the CPU 11 asks the mobile telephone how much electronic money the EEPROM 34 holds. At Step ST120, the CPU 11 determines whether the electronic money stored in the EEPROM 34 is at least equal to the amount that the customer should pay. If YES, the process goes to Step ST121. At Step ST121, the CPU 11 causes the customer-side display 3 and the operator-side display 5 to display the message of "Account can be settled."

At Step ST122, the CPU 11 transmits, by the short-range radio communication, a demand to the mobile telephone, demanding that the amount that the customer should pay be transferred the EEPROM 34 to the POS terminal 1. At Step ST123, it is determined whether the POS terminal has received the electronic money in the amount demanded, from the mobile telephone. If YES, the process goes to Step ST124. At Step ST124, the CPU 11 settles account. More precisely, the CPU 11 writes the amount of electronic money received, into a specific area of the RAM 13, in association with the device ID stored in the first ID storage area of the RAM 13.

Then, at Step ST125, the CPU 11 causes the customer-side display 3 and the operator-side display 5 to display the message of "Account has been settled." At the same time, the CPU 11 transmits a command to the mobile telephone by short-range radio communication, whereby the display 38 of the telephone displays the message of "Account has been settled." At Step ST126, the CPU 11 deletes the device ID of the mobile telephone from the first and second ID storage areas of the RAM 13. The process is thus terminated.

If NO at Step ST120, that is, if the electronic money stored in the EEPROM 34 is less than the amount that the customer should pay, the process goes to Step ST127. At Step ST127, the CPU 120 causes the customer-side display 3 and the operator-side display 5 to display the message of "Account cannot be settled."

Then, at Step ST128, the CPU 11 may receive a settlement command other than an electronic settlement command. Assume that the POS terminal operator pushes the receipt/cash-settlement key, generating a cash settlement command. In accordance with this command, the CPU 11 performs the cash settlement. Thereafter, the process goes to Step ST126. At Step ST126, the CPU 11 deletes the device ID of the mobile telephone from the first and second ID storage areas of the RAM 13. The process is thus terminated.

The operator of the POS terminal 1 keeps standing at the operator side of the POS terminal 1, waiting for the customer. The customer stands customer side of the POS terminal 1 and informs the operator that he or she wishes to settle accounts for the items he or she wants to buy. The customer reads the message of "Electronic settlement is also possible, by using your mobile telephone" displayed on the guidance display 2.

The operator uses the scanner 7, scanning the barcodes labeled on the items, one after another. Thus, the barcode data items, each representing the name and price of one item. The barcode data items are sequentially input into the POS terminal 1. In the POS terminal 1, the price of each item is registered as a sales amount. At the same time, the name and price of each item are displayed on the customer-side display 3 and the operator-side display 5. The customer and the operator looks at the displays 3 and 5, respectively, and determine if the sales amount registered is correct.

Upon registering the sales amounts about all items the customer wants to buy, the operator pushes the subtotal key. When the sub-total button is pushed, the CPU 11 calculates an amount that the customer should pay, from the prices of the items registered as the sales. The amount thus calculated is displayed on the customer-side display 3 and the operator-side display 5. Then, the operator asks the customer whether he or she wishes to pay in cash for the items or settle account by using the mobile telephone.

If the customer tells that he or she make an electronic settlement by using the mobile telephone, the operator depresses the electronic settlement key. Then, the guidance display 2 displays the message of "Hold your telephone within the blue frame." Following this guidance, the customer holds his or her mobile telephone within the blue frame of the guidance display 2.

When the customer holds the mobile telephone within the blue frame, the communication range is set at the first communication range that is relatively small. Hence, the antenna 4 can easily and reliably catch any data transmitted from the mobile telephone. In most cases, the telephone can be readily identified as one from which the POS terminal 1 may receive the information for settling accounts. (In some cases, another telephone that happens to lie within the blue frame.) When the mobile telephone is identified as such, the POS terminal 1 transmits a confirmation code, the data representing the amount the customer should pay and the message of "Input the confirmation code" to the customer's mobile telephone. The display 38 of the telephone displays the confirmation code, the amount to be paid and the message.

The customer compares the amount displayed on the display 38 with the amount displayed on the customer-side display 3 of the POS terminal 1. If the amounts compared are identical, the customer knows that his or her mobile telephone has been identified as the source of data necessary for the electronic settlement.

At this time, the guidance display 2 displays the message of "Move your telephone out the blue frame, check the displayed amount, and input the displayed confirmation code to your telephone."

Following the message, the customer moves the mobile telephone from the blue frame to a position where he or she can easily operate the telephone, checks the amount displayed on the display 38, and operates the operation section 40 for inputting the conformation code displayed on the display 38. The conformation code inputted into the mobile telephone is not unique to the telephone, unlike the device ID assigned to the mobile telephone. The POS terminal 1 has generated this code for a temporary use only, not in accordance with particular rules. The confirmation code alone cannot identify the mobile telephone or the customer who holds the telephone. Even if a third party looks at the display 38 and gets the confirmation code, the customer's privacy is completely protected.

If the electronic money stored in the mobile telephone into which the customer has input the confirmation code is equal to or greater than the amount to be paid, the customer-side display 3 and operator-side display 5 of the POS terminal 1 display the message of "Electronic settlement is possible."

At the same time, the display 38 of the mobile telephone displays the amount to be paid, the balance after the electronic settlement. The display 38 also displays the message of "Check the amount and balance, and authenticate the electronic settlement." Having read the message, the customer may operate the operation section 40, thus inputting an authentication code. In this case, the telephone transmits the amount of electronic money, which the customer should pay, to the POS terminal 1. Note that the authentication code authorizes the POS terminal 1 to receive said amount of electronic money. Unless the authentication code that the customer has input is correct, the mobile telephone would not transmit the electronic money to the POS terminal 1.

Upon receipt of the electronic money from the mobile telephone, the POS terminal 1 starts the electronic settlement in a prescribed manner. The customer-side display 3 and operator-side display 5 of the POS terminal 1 display the message of "Electronic settlement has been completed." The same message is displayed on the display 38 of the mobile telephone, too.

The POS terminal 1 may not receive the confirmation code from the mobile telephone within a predetermined time from the moment the guidance display 2 started displaying the message of "Hold your telephone within the blue frame." If this is the case, the operator-side display 5 displays the message of "Ask the customer if he or she has operated the telephone as instructed on the display 38". At the same time, the operator-side display 5 displays the message of "Do you wait for the confirmation code from the telephone, or do you want to acquire the device ID of another mobile telephone?"

The electronic money stored in the EEPROM 34 may be less than the amount that the customer should pay. In this case, the operator-side display 5 of the POS terminal 1 displays the message of "Electronic settlement is impossible." Reading this message, the operator asks the customer to pay cash for the items he or she is going to buy. If the customer agrees to pay in cash, the operator will settle the account in cash.

In the embodiment of the invention, the POS terminal 1 receives, one by one, the device IDs of the mobile telephones existing in the first communication range that is narrow and lies around the antenna 4. Every time the POS terminal 1 acquires a device ID from a mobile telephone, it transmits a confirmation code from the antenna 4 and waits for the confirmation code returned from the mobile telephone. When the POS terminal 1 receives the confirmation code returned, it designates the telephone having the device ID as one from which to acquire settlement data. Thus, the POS terminal 1 can reliably identify the mobile telephone from which it should receive settlement data, even if many other mobile telephones exist around it.

The first communication range of the POS terminal 1 gradually expands, and the POS terminal 1 designates a mobile telephone from which to receive settlement data. Hence, the mobile telephone those device ID is the first detected by the POS terminal 1 detects is most likely one with which the POS terminal settles an account.

Every time the POS terminal 1 receives a device ID from a mobile telephone, it expands its short-range radio communication range. It follows that the POS terminal 1 and the mobile telephone can be connected by radio even if the customer holds the telephone at such a position that he or she can easily operate the operation section 40 to input the confirmation code and the authentication code. Further, the short-range radio communication would not be interrupted even if the customer holds the telephone at such a position. Therefore, the electronic settlement would not be suspended at all.

In the embodiment, the first communication range of the POS terminal 1 gradually expands. Nonetheless, the first communication range may be fixed. In this case, the POS terminal 1 expands its communication range from the first range to the second range after it acquires the device ID from the mobile telephone.

In the embodiment described above, the settlement data stored in each mobile telephone is electronic money. Nevertheless, the electronic money may be replaced by the ID number issued to the customer by a credit company, the customer's account number registered at a financial organization, a point card, the electronic coupons or similar data, or all of these data items.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for settling accounts, comprising:

short-range communications means for communicating with portable device by a short-range radio;

antenna for radiating and catching short-range radio waves;

first range-set means for setting area of a short-range radio communication to a first communication range lying near the antenna;

second range-set means for setting the area of the short-range radio communication to a second communication range broader than the first communication range;

address-acquirement means for acquiring a radio communication address from said portable device within the area of the short-range radio communication by the short-range radio;

area-change means for changing area of the short-range radio communication to the second communication range, when said address-acquirement means has acquired the radio communication address from said portable device within said first communication range;

data-receive means for receiving data necessary for settling accounts from said portable device within the second communication range by virtue of the short-range radio communication; and account-settlement means for settling accounts of transaction on the basis of the data received by said data-receive means.

2. An apparatus for settling accounts, comprising:

short-range communications means for storing data necessary for settling accounts for a transaction and designed to perform short-range radio communication with at least one portable device which is assigned with a radio communication address for the short-range radio communication;

an antenna which radiates and catch radio waves to help the short-range communications means to perform the short-range radio communication;

range-controlling means for setting a range of the short-range radio communication to a first communication range lying near the antenna or a second communication range broader than the first communication range;

address-acquiring means for acquiring a radio communication address from said at least one portable device approaching the antenna, after the range-controlling means has set the range of the short-range radio communication to the first communication range;

range-expanding means for causing the range-controlling means to expand the range of the short-range radio communication to the second communication range when the address-acquiring means acquires the radio communication address from said at least one portable device;

data-receiving means for receiving data necessary for settling accounts, from said at least one portable device by virtue of the short-range radio communication after the range-expanding means has caused the range-controlling means to expand the range of the short-range radio communication; and account-settling means for settling accounts for the transaction on the basis of the data that the data-receiving means has received.

3. An apparatus according to claim 2, wherein the range-controlling means controls the range of the short-range radio communication, such that the first communication range gradually expands from the vicinity of the antenna in order to render it easy for the address-acquiring means to acquire the radio communication address from said at least one portable device.

4. An apparatus according to claim 2, wherein said at least one portable device has a display section, and the apparatus further comprising: code-transmitting means for transmitting a specific code by virtue of the short-range radio communication, when the address-acquiring means acquires the radio communication address from said at least one portable device, said specific code causing the display section to display the radio communication address.

5. An apparatus according to claim 2, wherein said at least one portable device has a display section and an operation section; the display section displays data when said at least one portable device receives a specific code associated with the data transmitted by virtue of the short-range radio communication; said at least one portable device transmits the specific code back to the apparatus by virtue of the short-range radio communication when the operation section input specific data; and the apparatus further comprising:

code-transmitting means for transmitting the specific code to said at least one portable device by virtue of the short-range radio communication when the address-acquiring means acquires the radio communication address from said at least one portable device; and data-demanding means for demanding the data necessary for settling accounts, from said at least one portable device, upon receipt of a code from said at least one portable device, said code being identical to the specific code transmitted by the code-transmitting means, the account-settling means settles account for the transaction on the basis of the data which the data-demanding means has demanded and which the data-receiving means has received.

6. An apparatus according to claim 2, wherein said at least one portable device has a display section and an operation section; the display section displays data when said at least one portable device receives a specific code associated with the data and transmitted by virtue of the short-range radio communication; said at least one portable device transmits the specific code back to the apparatus by virtue of the short-range radio communication when the operation section inputs specific data; and the apparatus further comprising:

code-transmitting means for transmitting the specific code to said at least one portable device by virtue of the short-range radio communication when the address-acquiring means acquires the radio communication address from said at least one portable device; and address-reacquiring means for acquiring an address different from the radio communication address acquired by the address-acquiring means, when said at least one portable device transmits a code identical to the specific code, back to the apparatus.

7. An apparatus according t claim 2, wherein said at least one portable device has a display section and an operation section; the display section displays data when said at least one portable device receives a specific code associated with the data and transmitted by virtue of the short-range radio communication; said at least one portable device transmits the specific code back to the apparatus by virtue the short-range radio communication when the operation section inputs specific data; and the apparatus further comprising:

an operator-side display section for display information to an operator;

code-transmitting means for transmitting the specific code to said at least one portable device by virtue of the short-range radio communication when the address-acquiring means acquires the radio communication address from said at least one portable device; and clock means for measuring time, starting when the code-transmitting means transmits the specific code; and display control means for causing the operator-side display section to display an error message when said at least one portable device transmits no code identical to the specific code, back to the apparatus even after the time measured by the clock means exceeds a preset time.

8. An apparatus according to claim 2, wherein said at least one portable device has a display section and an operation section; the display section displays data when said at least one portable device receives a specific code associated with the data and transmitted by virtue of the short-range radio communication; said at least one portable device transmits the specific code back to the apparatus by virtue the short-range radio communication when the operation section inputs specific data; and the apparatus further comprising:

code-transmitting means for transmitting the specific code to said at least one portable device by virtue of the short-range radio communication when the address-acquiring means acquires the radio communication address from said at least one portable device; and clock means for measuring time, starting when the code-transmitting means transmits the specific code; and means for instructing an operator to cause the apparatus to wait for a code identical to the specific code or to cause the address-acquiring means to acquire a different radio communication address, when said at least one portable device transmits no code identical to the specific code, back to the apparatus even after the time measured by the clock means exceeds a preset time.

9. A method of settling accounts, in which a radio communication address for short-range radio communication is specified, which address is assigned to at least one portable device that stores data necessary for settling accounts for a transaction, and the data necessary for settling accounts is acquired from said at least one portable device assigned with the radio communication address specified, and the accounts are settled in accordance with the data acquired, said method comprising the steps of:

acquiring the radio communication address from said at least one portable device existing in a first communication range set in the vicinity of an antenna designed for short-range radio communication;

expanding a range of the short-range radio communication to a second communication range broader than the first communication range, when the radio communication address is acquired in the step of acquiring the radio communication address;

transmitting a specific code to said at least one portable device to which the radio communication address acquired in the step of acquiring the radio communication address is assigned, by virtue of the short-range radio communication the range of which has been expanded in the step of expanding the range of the short-range radio communication; and demanding the data necessary for settling accounts, from said at least one portable device, when a code identical to the specific code transmitted in the step of transmitting a specific code is sent back from said at least one portable device; and settling accounts for the transaction on the basis of the data necessary for settling accounts, when the data is received from said at least one portable device which has demanded the data necessary for setting accounts in the step of demanding the data.

* * * * *